United States Patent
Parente Da Silva et al.

(10) Patent No.: US 12,012,189 B2
(45) Date of Patent: Jun. 18, 2024

(54) SYSTEM AND METHOD OF OPERATION FOR REMOTELY OPERATED VEHICLES LEVERAGING SYNTHETIC DATA TO TRAIN MACHINE LEARNING MODELS

(71) Applicant: Abyssal S.A., Matosinhos (PT)

(72) Inventors: Manuel Alberto Parente Da Silva, Maia (PT); Pedro Miguel Vendas Da Costa, Oporto (PT)

(73) Assignee: Ocean Infinity (Portugal), S.A., Matosinhos (PT)

( * ) Notice: Subject to any disclaimer, the term of this patent is extended or adjusted under 35 U.S.C. 154(b) by 615 days.

(21) Appl. No.: 17/266,059

(22) PCT Filed: Aug. 8, 2018

(86) PCT No.: PCT/IB2018/055978
§ 371 (c)(1),
(2) Date: Feb. 4, 2021

(87) PCT Pub. No.: WO2020/030950
PCT Pub. Date: Feb. 13, 2020

(65) Prior Publication Data
US 2021/0309331 A1 Oct. 7, 2021

(51) Int. Cl.
*B63G 8/00* (2006.01)
*G05B 13/02* (2006.01)
*G05D 1/00* (2006.01)

(52) U.S. Cl.
CPC ......... *B63G 8/001* (2013.01); *G05B 13/0265* (2013.01); *G05D 1/0044* (2013.01); *B63G 2008/005* (2013.01); *G05D 1/0088* (2013.01)

(58) Field of Classification Search
CPC ... B63G 8/001; B63G 2008/005; B63C 11/42; G05B 13/0265; G05D 1/0044; G05D 1/0088; G06N 5/00
See application file for complete search history.

(56) References Cited

U.S. PATENT DOCUMENTS 10,007,269 B1 * 6/2018 Gray ................... G06F 18/2415
10,394,327 B2 8/2019 Chizeck
(Continued)

FOREIGN PATENT DOCUMENTS

EP 0674977 A1 10/1995
FR 2949167 2/2011
(Continued)

OTHER PUBLICATIONS

International Search Report and Written Opinion received for PCT Patent Application No. PCT/US2018/055979, dated Mar. 7, 2019; 13 pages.
(Continued)

*Primary Examiner* — Frantz B Jean
(74) *Attorney, Agent, or Firm* — Baker Botts L.L.P.

(57) ABSTRACT

The present invention provides systems and methods for leveraging synthetic data to train machine learning models. A synthetic training engine may be used to train machine learning models. The synthetic training engine can automatically annotate real images for valuable tasks, such as object segmentation, depth map estimation, and classifying whether a structure is in an image. The synthetic training engine can also train the machine learning model with synthetic images in such a way that the machine learning model will work on real images. The output of the machine learning model may perform valuable tasks, such as the detection of integrity threats in underwater structures.

20 Claims, 15 Drawing Sheets

(56) References Cited

U.S. PATENT DOCUMENTS

| | | | |
|---|---|---|---|
| 2014/0316611 A1 | 10/2014 | Parente Da Silva | |
| 2019/0147220 A1 | 5/2019 | Mccormac et al. | |
| 2019/0311546 A1* | 10/2019 | Tay | G05D 1/0088 |
| 2020/0026283 A1* | 1/2020 | Barnes | G06V 20/58 |
| 2020/0041276 A1 | 2/2020 | Chakravarty et al. | |
| 2020/0292817 A1 | 9/2020 | Jones | |
| 2021/0304430 A1 | 9/2021 | Vendas Da Costa | |
| 2022/0005332 A1 | 1/2022 | Metzler | |

FOREIGN PATENT DOCUMENTS

| | | | |
|---|---|---|---|
| WO | 2013/068821 A2 | 5/2013 | |
| WO | WO-2013068821 A2 * | 5/2013 | G05D 1/0038 |

OTHER PUBLICATIONS

International Search Report and Written Opinion received for PCT Patent Application No. PCT/US2018/055976, dated Feb. 22, 2019; 11 pages.

International Search Report and Written Opinion received for PCT Patent Application No. PCT/US2018/055977, dated Apr. 9, 2019; 21 pages.

International Search Report and Written Opinion received for PCT Patent Application No. PCT/US2018/055978, dated Feb. 22, 2019; 12 pages.

Kalwa, J. et al., "The MORPH Project: Actual Results," Oceans 2015—Genova, IEEE, May 18, 2015, 8 pages.

Eckstein, Sebastian et al., "Towards Innovative Approaches of Team-Oriented Mission Planning and Mission Languages for Multiple Unmanned Marine Vehicles in Event-Driven Mission," MTS/IEEE Oceans, Bergen, Jun. 2013, 8 pages.

Vijayanarasimhan, Sudheendra, et al., "SfM-Net: Learning of Structure & Motion from Video," retrieved from the internet on Feb. 21, 2019, URL: https://arxiv.org/pdf/1704.07804.pdf, 5 pages.

Bruno, Fabio, et al., "Virtual and Augmented Reality Tools to Improve the Exploitation of Underwater Archaeological Sites by Diver and Non-diver Tourists," International Conference on Simulation, Modeling, and Programming for Autonomous Robots, SIMPAR 2010, Oct. 31, 2016, 12 pages.

Marchand, Eric, et al., "Pose Estimation for Augmented Reality: A Hands-On Survey," IEEE Transactions on Visualization and Computer Graphics, vol. 22, No. 12, Dec. 1, 2016, 19 pages.

Vlahakis, Vassilio et al., "Archeoguide: an augmented reality guide for archaeological sites," IEEE Computer Graphics and Applications, vol. 22, No. 5, Sep. 1, 2002 , 9 pages.

Sharma, Ojaswa et al., "Navigation in AR based on digital replicas," The Visual Computer, Springer, Berlin, DE, vol. 34, No. 6, May 2, 2018, 12 pages.

Reitmayr, Gerhard et al., "Going out," Mixed and Augmented Reality, ISMAR 2006. IEEE/ACM International Symposium On, IEEE, PI, Oct. 22, 2006 , 10 pages.

Tzafestas, Costas S., "Virtual and Mixed Reality in Telerobotics: A Survey," Industrial Robotics—Programming, Simulation and Application, Jan. 1, 2006, 34 pages.

O'Byrne, Michael et al., "Semantic Segmentation of Underwater Imagery Using Deep Networks Training in Synthetic Imagery," Journal of Marine Science and Engineering, vol. 6, No. 3, Aug. 3, 2018, 15 pages.

Choi, S.K., et al., "Distributed Virtual Environment Collaborative Simulator for Underwater Robots," Proceedings of the 2000 IEEE/RSJ International Conference on Intelligent Robots and Systems, Oct. 2000, 6 pages.

European Patent Office, Examination Report for EP Application No. 18 762 931.6-1218 dated Feb. 6, 2023, 4 pages.

Brazilian Patent and Trademark Office, Preliminary Office Action Brazilian Patent Application No. BR1120210020276, dated Jun. 20, 2023, 4 pages.

Intellectual Property Office of Singapore, Application No. 11202100945W, Written Opinion dated Nov. 25, 2022, 6 pages.

Intellectual Property Office of Singapore, Application No. 11202100949Y, Written Opinion dated Dec. 1, 2022, 7 pages.

Baraldi et al., "LAMV: Learning to align and match videos with kernelized temporal layers," Facebook AI Research, Jun. 19, 2018, URL:https://ai.facebook.com/results/?content_types%5B0%5D=publication&page=10&years%5B0%5D=2018 (Year 2018).

European Patent Office, Examination Report for EP Application No. 18 770 078.6-1207 dated Mar. 9, 2023, 4 pages.

* cited by examiner

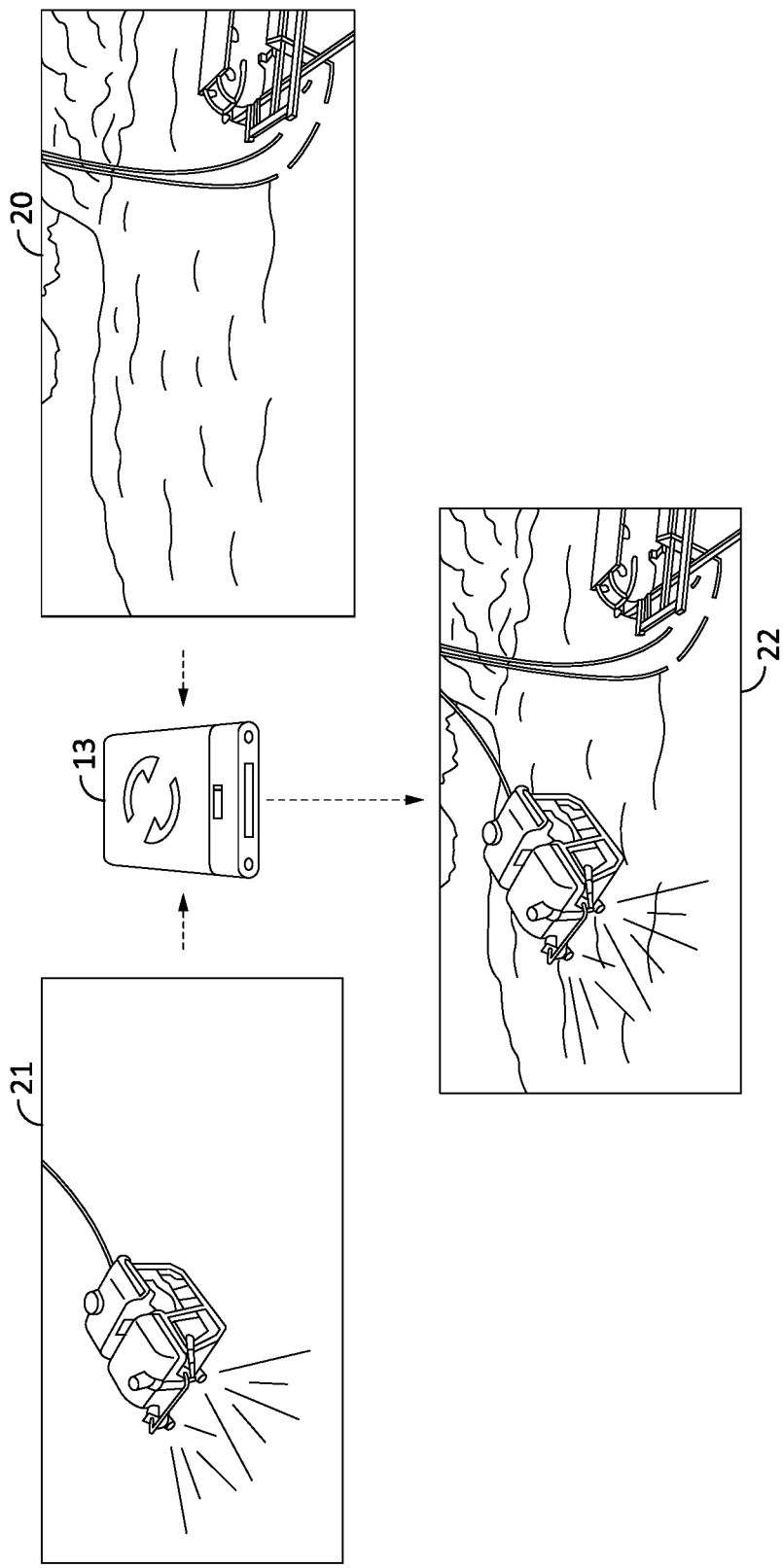

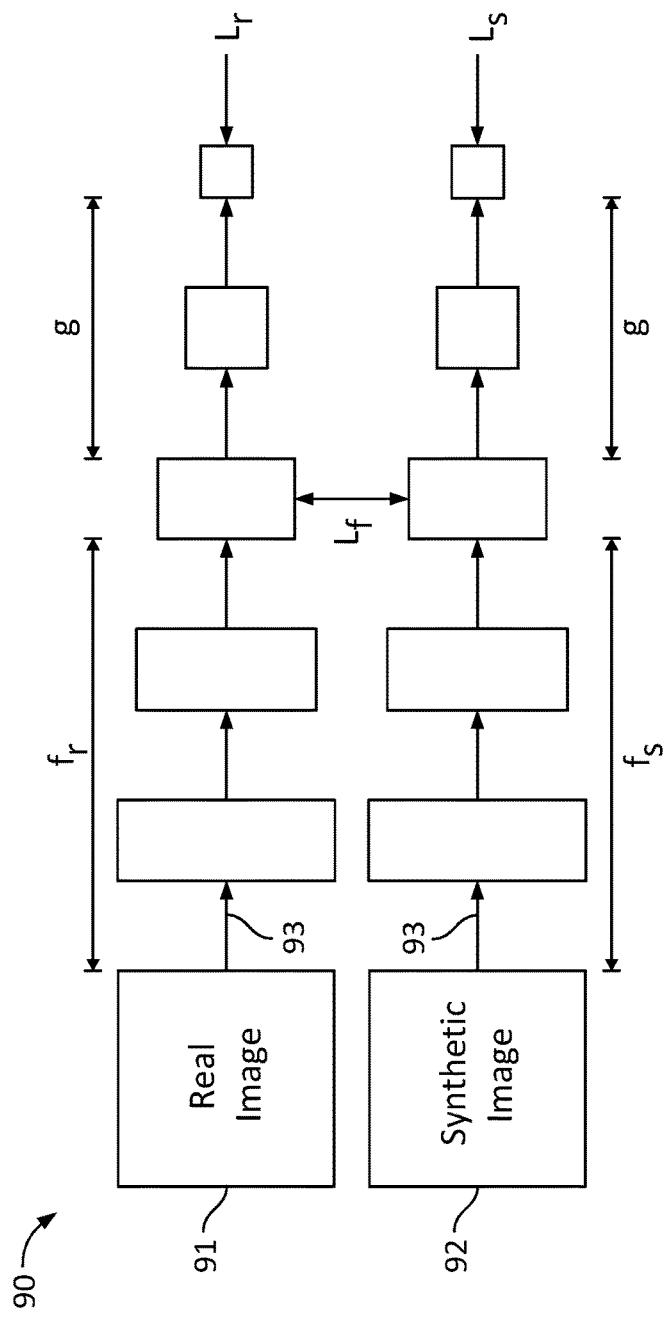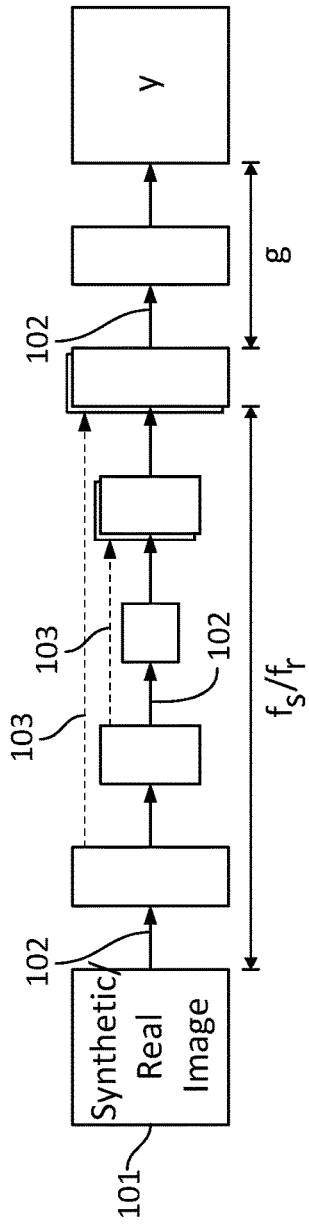

SYSTEM AND METHOD OF OPERATION FOR REMOTELY OPERATED VEHICLES LEVERAGING SYNTHETIC DATA TO TRAIN MACHINE LEARNING MODELS

CROSS-REFERENCE TO RELATED APPLICATIONS

This application is a U.S. National Stage Application of International Application No. PCT/IB2018/055978 filed Aug. 8, 2018, which designates the United States.

The disclosures of published patent documents referenced in this application are hereby incorporated in their entireties by reference into this application in order to more fully describe the state of the art to which this invention pertains.

The present invention relates to a system of operation for remotely operated vehicles ("ROV"), and methods for its use. In particular, the present invention provides a system and method of operation for ROVs leveraging synthetic data to train machine learning models.

BACKGROUND OF THE INVENTION

Exploration of the last frontier on earth, the sea, is largely driven by the continuing demand for energy resources. Because humans are not able to endure the pressures induced at the depths at which energy reconnaissance occurs, we have become increasingly reliant upon technology such as autonomous vehicles and ROV technology. The future of the exploration of the oceans is only as fast, reliable and safe as the available technology. Thus, new innovations in exploration are needed.

SUMMARY OF THE INVENTION

The embodiments disclosed herein provide systems and methods such that synthetic data may be used to train machine learning models that still perform well in real data. It is known that machine learning methods generally work better as the training dataset increases. However, in most cases, annotated data is very costly to obtain and, therefore, there is a big motivation to use simulated data to train the models to reduce costs and increase the dataset's size.

For example, image segmentation generally requires a human annotator to label each pixel of an image with the corresponding pixel class. This is a very time-consuming task. Moreover, it is likely that different annotators have different policies regarding where the boundary between different objects should be placed that may lead to data inaccuracy.

With synthetic data, the object to which a pixel belongs to is known. It is even possible to obtain precise annotations for more complex problems that a human annotator cannot predict, such as a depth map or surface normals. Also, in some cases, vast amounts of synthetic data may be generated, even of events that are unlikely in the real world.

However, simulations are usually simplifications of the real world. Synthetic images tend to have simplistic textures and lighting that do not exactly mimic reality. This poses some challenges in training a deep learning model on synthetic data that generalizes to real data.

The embodiments disclosed herein solve this problem by replaying real examples on the virtual world. Then, the embodiments constrain the features that are extracted on the real and virtual images to be equal. These systems and methods work directly with images. Further, the systems and methods also work on videos, for example by dividing the videos into independent frames.

BRIEF DESCRIPTION OF THE DRAWINGS

The aforementioned and other aspects, features and advantages can be better understood from the following detailed description with reference to the accompanying drawings wherein:

FIG. 5B illustrates hybrid 3D imagery obtained by superimposing a virtual video and a real video, according to some embodiments;

FIG. 9 depicts an architecture of a model to map real and synthetic images, according to some embodiments; and FIG. 10 depicts an architecture example for feature extraction models, according to some embodiments.

DETAILED DESCRIPTION OF THE INVENTION

Figure 1A:
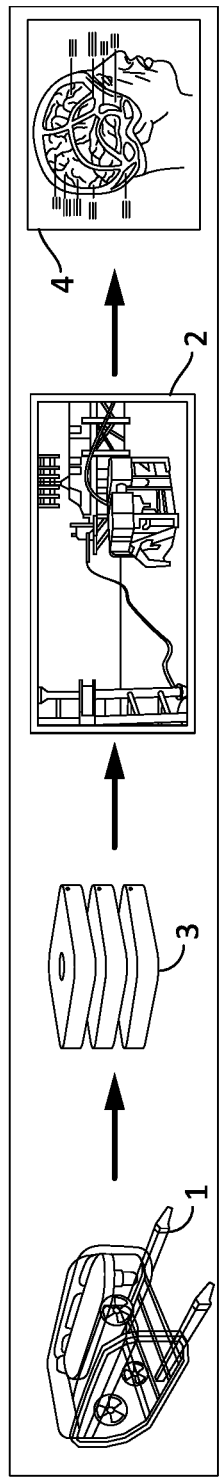
FIG. 1A shows a diagrammatic view of a system, according to some embodiments.

The invention provides a system for operating a remotely operated vehicle (ROV) leveraging synthetic data to train machine learning models comprising:
  a) a synthetic training engine comprising:
    i. a ROV with a video camera and a positional sensor;
    ii. a video dataset to store video data and real images coming from the ROV;
    iii. a telemetry dataset to store telemetry data coming from the ROV;
    iv. a 3D model dataset with 3D model data of a scene where an ROV may operate;
    v. a synthetic dataset to store synthetic video data or label data;
    vi. a simulator module;
    vii. a machine learning trainer module; and
    viii. a model module.

The systems and methods disclosed herein may further have one or more of the following additional features, which may be combined with one another or any other feature described herein unless clearly mutually exclusive.

The simulator module may have access to the video dataset, the telemetry dataset, the 3D model dataset, and the synthetic dataset, and the simulator module may include a ROV's piloting simulator.

The machine learning trainer module may have access to the video dataset and the synthetic dataset.

The model module may include an application using a model trained in the machine learning trainer module and the model module may be connected to at least one ROV.

The simulator module may be operable to replay a mission in a ROV's pilot training simulator.

The simulator module may replay the mission by retrieving ROV telemetry from the telemetry dataset and 3D model data from the 3D model dataset, may denoise the telemetry data, and may generate a synthetic video of the mission.

The synthetic training engine may be operable to automatically annotate the real images.

The synthetic training engine may be operable to automatically annotate the real images for object segmentation, depth map estimation, and classifying whether a specific structure is in the real image.

The synthetic training engine may be operable to replay a mission and annotate the real images.

The synthetic training engine may map both the real images and the synthetic video data into a shared feature representation.

The synthetic training engine may have three training settings: (i) a simreal setting where both simulated data and real data are available, (ii) a sim setting where only simulated data is available, and (iii) a real setting where only real data is available.

The synthetic training engine may train the three training settings simultaneously and randomly samples one of the three training settings at each training iteration.

The invention also provides a system for undersea exploration comprising:
a) a remote operated vehicle (ROV) comprising a camera for acquiring a real video;
b) a networked operating system comprising a computer and computer executable software comprising a synthetic training engine, wherein the synthetic training engine comprises:
  i. a ROV with a video camera and a positional sensor;
  ii. a video dataset to store video data and real images coming from the ROV;
  iii. a telemetry dataset to store telemetry data coming from the ROV;
  iv. a 3D model dataset with 3D model data of a scene where an ROV may operate;
  v. a synthetic dataset to store synthetic video data or label data;
  vi. a simulator module;
  vii. a machine learning trainer module; and
  viii. a model module; and
c) a navigation interface configured to display a graphical user interface, the navigation interface comprising at least one networked monitor.

The simulator module may have access to the video dataset, the telemetry dataset, the 3D model dataset, and the synthetic dataset and the simulator module may include a ROV's piloting simulator.

The machine learning trainer module may have access to the video dataset and the synthetic dataset.

The model module may include an application using a model trained in the machine learning trainer module and the model module may be connected to at least one ROV.

The simulator module may be operable to replay a real mission in a ROV's pilot training simulator.

The simulator module may replay the mission by retrieving ROV telemetry from the telemetry dataset and 3D model data from the 3D model dataset, denoise the telemetry data, and generate a synthetic video of the mission.

The synthetic training engine may be operable to automatically annotate the real images.

The invention also provides a method of leveraging synthetic data to train machine learning models for remotely operated vehicles (ROV) comprising:
a) obtaining 3D data from scenes where an ROV is operating;
b) storing 3D elements in a database module, the 3D elements representing objects disposed in the ROV's operation environment and comprising the 3D data;
c) receiving telemetry data and video data from a ROV;
d) replaying a ROV mission;
e) generating synthetic images from different views in the video data or from synthetic scenes;
f) pairing synthetic images and real images;
g) training a machine learning model.

The invention also provides a computer program product, stored on a computer-readable medium, for implementing any method according to invention as described herein.

As mentioned supra, various features and functionalities are discussed herein by way of examples and embodiments in a context of ROV navigation and machine learning for use in undersea exploration. In describing such examples and exemplary embodiments, specific terminology is employed for the sake of clarity. However, this disclosure is not intended to be limited to the examples and exemplary embodiments discussed herein, nor to the specific terminology utilized in such discussions, and it is to be understood that each specific element includes all technical equivalents that operate in a similar manner.

Definitions

The following terms are defined as follows:

3D elements; 3D objects—Data defining three-dimensional shapes, obtained by modeling sonar-derived input or user-determined input.

Abstraction; layer of abstraction—A characteristic of executable software, wherein differing data formats are standardized into a common format such that components are made compatible.

Data engine—A collection of modules, according to an embodiment of this invention, which is responsible for at least the acquisition, storing and reporting of data collected over the course of a ROV mission.

Fail state—A state, defined by a user or by a standard, wherein the functionality of the system, according to some embodiments of the invention, has decreased to an unacceptable level.

Luminance threshold—A system-determined value of RGB (Red, Green, Blue) pixel color intensity which defines a visible but transparent state for the images depicted by a digital image output device.

Module—A combination of at least one computer processor, computer memory and custom software that performs one or more defined functions.

Navigation engine—A collection of modules, according to some embodiments of this invention, which is responsible for making the Navigation Interface interactive, and for producing data for displaying on the Navigation Interface.

Positioned; geopositioned; tagged—Having a location defined by the Global Positioning System of satellites and/or acoustic or inertial positioning systems, and optionally having a location defined by a depth below sea level.

ROV—A remotely operated vehicle; often an aquatic vehicle. Although for purposes of convenience and brevity ROVs are described herein, nothing herein is intended to be limiting to only vehicles that require remote operation. Autonomous vehicles and semi-autonomous vehicles are within the scope of this disclosure.

Synthetic training engine—A collection of modules, according to some embodiments, which is responsible for leveraging synthetic data to train machine learning models.

Visualization engine—A collection of modules, according to an embodiment of this invention, which is responsible for producing the displayed aspect of the navigation interface. System Hardware and Devices Referring now to the drawings, wherein like reference numerals designate identical or corresponding parts throughout the several views, FIG. 1A diagrammatically depicts a system according to an embodiment of the invention. This system includes an ROV and its associated instrumentation 1, an operating system housed within computer hardware 3 and a user interface and its associated devices 2. The operating system 3 mediates interaction between the ROV 1 and the user 4, such that the user may submit commands and inquiries for information to the ROV 1, and obtain mechanical responses and data output from the ROV 1.

Figure 1B:
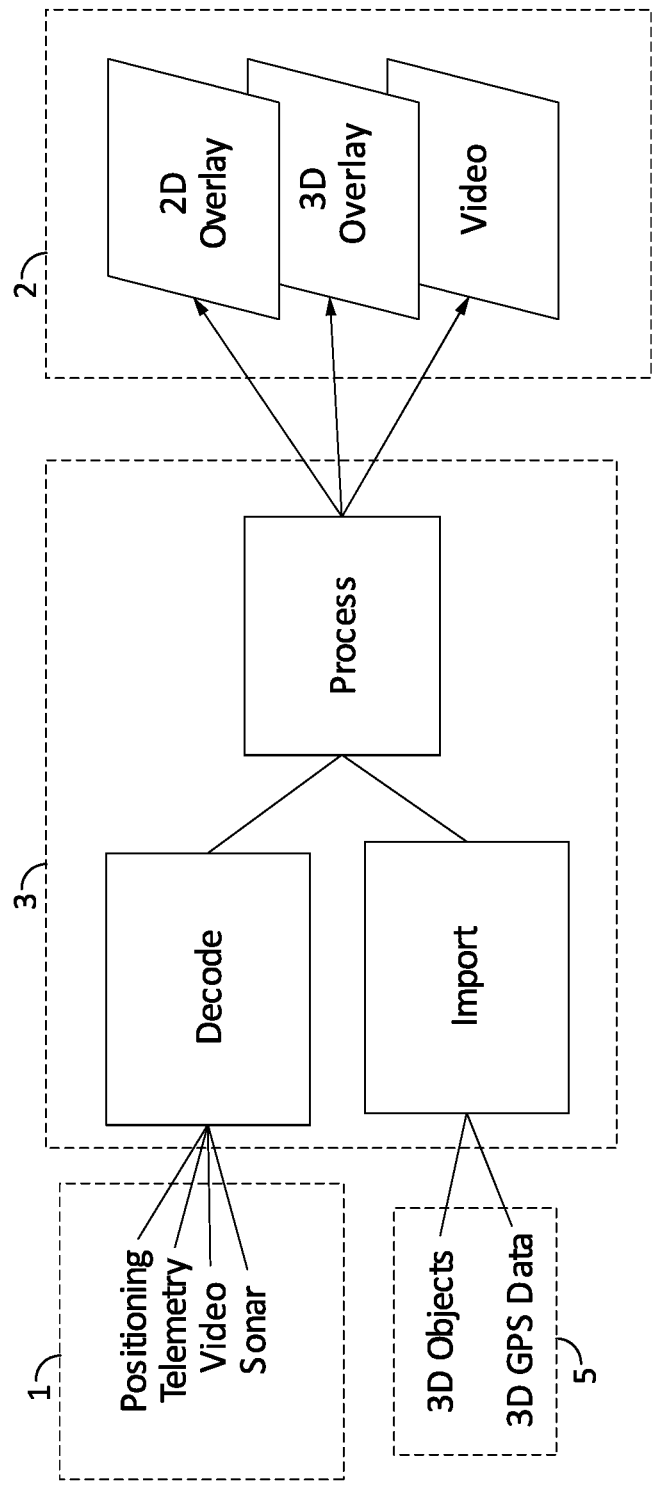
FIG. 1B shows a diagrammatic view of a system and its associated functions, according to some embodiments.

As seen from FIG. 1B, the operating system 3 may receive live information obtained by the ROV's 1 multibeam 3D real-time sonar, telemetry data, positioning data and video as well as programmed 3D objects from a database 5, and process that data to provide live 3D models of the environment for both augmented reality and full 3D rendering displayed at the user interface 2. The user interface 2 may also be used to display video obtained using the ROV's 1 digital instrumentation, including, for example, cameras and other sensors. The ROV 1 utilized in the system of the present invention is equipped with conventional instrumentation for telemetry and positioning, which are responsive to the commands mediated by the operating system 3.

In one embodiment of the invention, the hardware for the operating system 3 includes a high-end rack computer that can be easily integrated with any ROV control system. The several software modules that further define the operating system will be described in further detail infra.

Figure 2A:
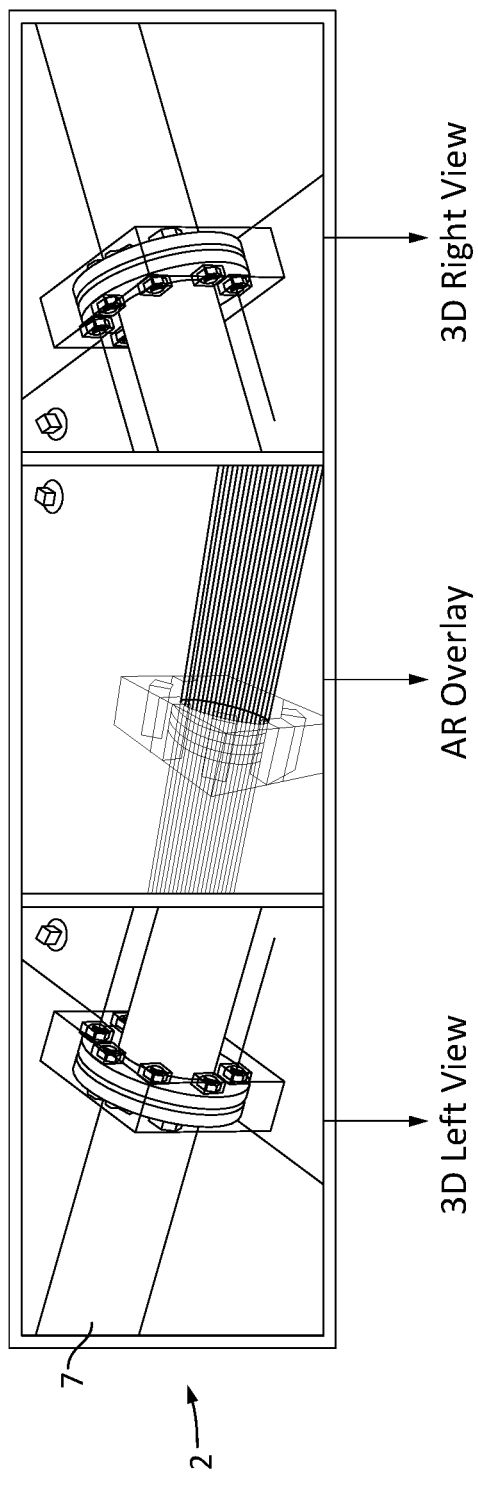
FIGS. 2A and 2B depict alternative views of a user interface of a system according to some embodiments.
Figure 2B:
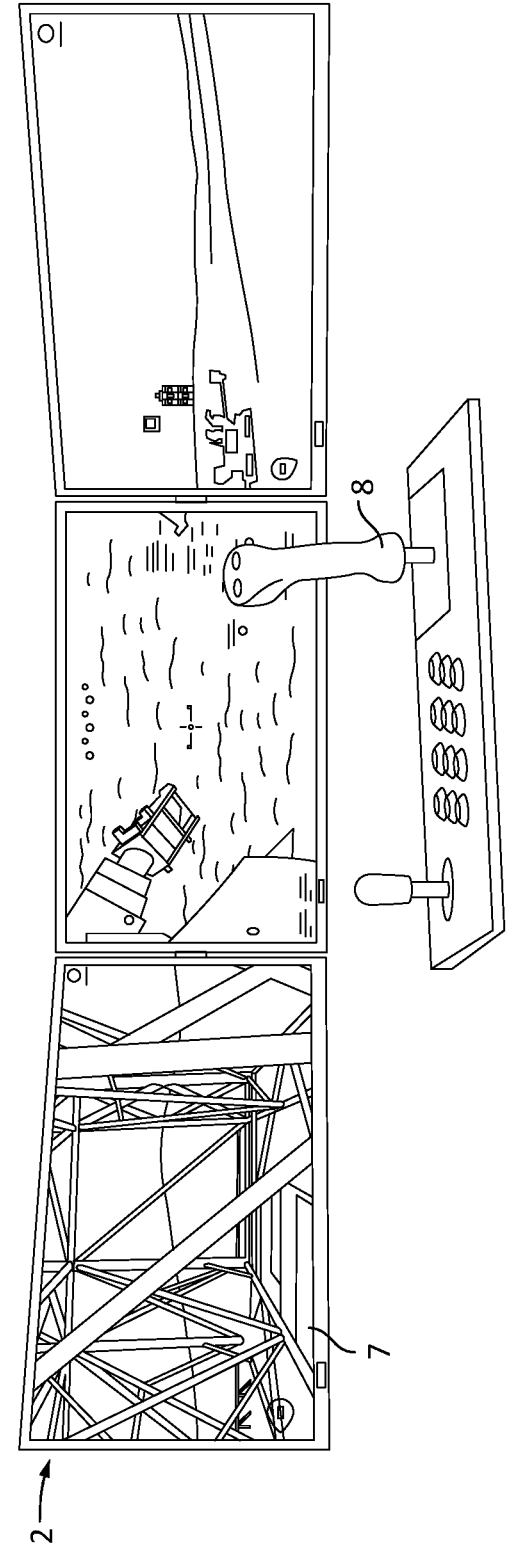

With reference to FIGS. 2A and 2B, the human-machine interface includes at least one monitor 7, and preferably three interactive monitors 7 for navigation. According to one embodiment shown in FIG. 2A, the center monitor 7 provides a video feed and augmented reality (AR), while the side monitors provide an expansion of the field of view of operation. In another aspect, the side monitors may allow the user to have a panoramic view of the ROV environment using full 3D visualization from the point of view of the ROV. As seen in FIG. 2B, the interaction between the user and the system may utilize joysticks 8, gamepads, or other controllers. In another embodiment, the user interface 2 may employ touch or multi-touch screen technology, audio warnings and sounds, voice commands, a computer mouse, etc.

Functional Modules Rather than developing a different operating system 3 for each brand and model of ROV 1, the embodiments described herein work by abstraction, such that the disclosed operating system 3 and associated hardware work the same way with all ROVs 1. For example, if one component delivers "$DBS,14.0,10.3" as a depth and heading coordinates, and another component delivers "$HD, 15.3,16.4" as heading and depth coordinates, these data strings are parsed into their respective variables: Depth1=14.0, Depth2=16.4, Heading1=16.4, Heading2=15.3. This parsing allows both system to work the same way, regardless of the data format details.

By developing a layer of abstraction of drivers for communication between the operating system 3 and the ROV hardware, the user 4 is provided with seamless data communication, and is not restricted to using particular ROV models. This abstraction further allows users 4 and systems 3 to communicate and network information between several systems and share information among several undersea projects. The use of a single system also allows for cost reduction in training, maintenance and operation of this system.

Figure 3A:
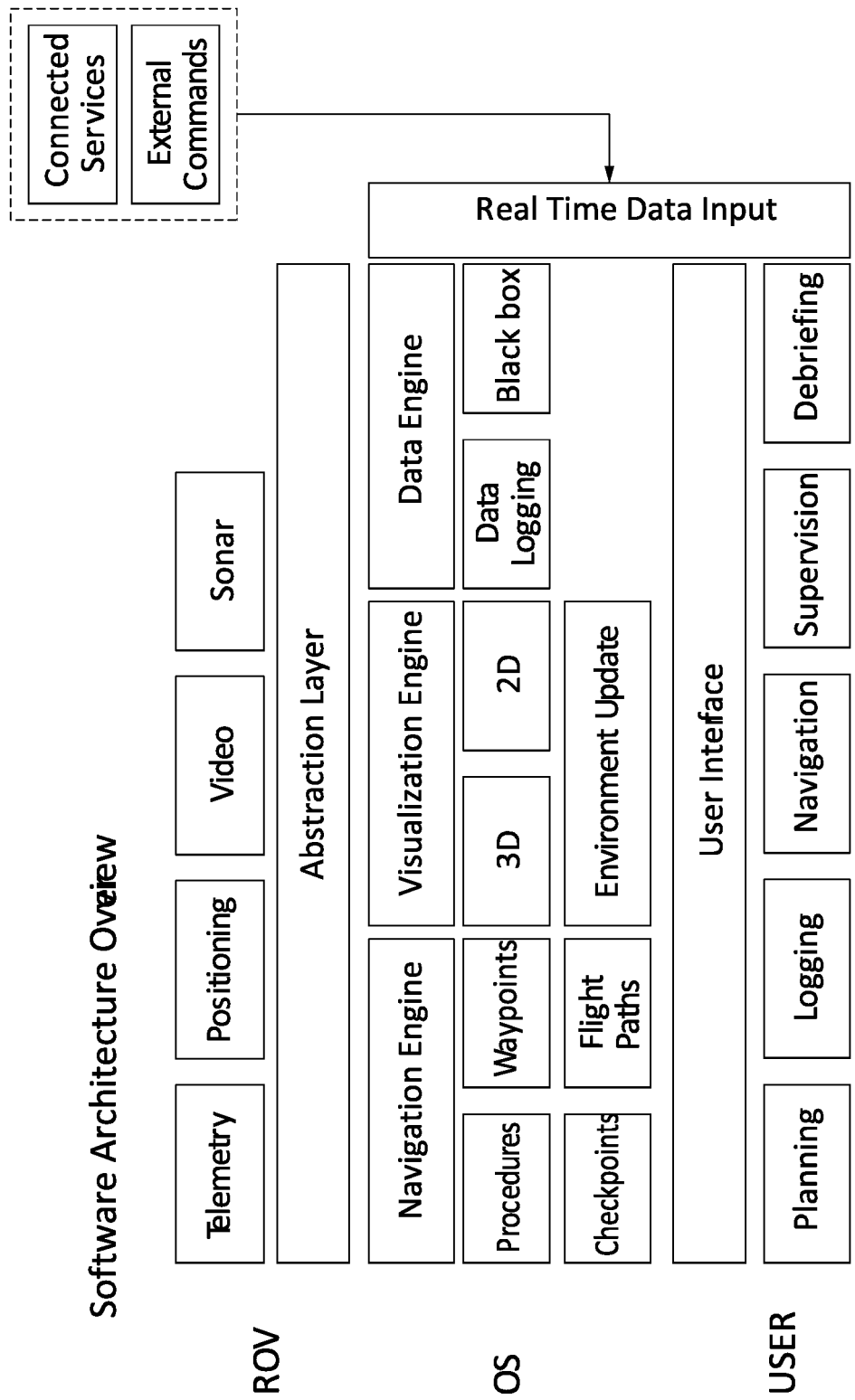
FIGS. 3A and 3B show software architecture overviews of a system, according to some embodiments.

FIG. 3A depicts a software architecture overview illustrating the component parts of the ROV 1, user interface 2 and operating system 3. Software counterparts are provided for the ROV's telemetry, positioning, video and sonar instrumentation. In order to implement user functions including planning, logging, navigation, supervision and debriefing, the operating system 3 provides a navigation engine, a visualization engine and a data engine. The operating system 3 is networked such that connected services and external command units can provide real-time data input. One of such external command units may be configured as a watchdog. The external watchdog system may perform periodic checks to determine whether the system is working properly, or is in a fail state. If the system is in a fail state, the watchdog may change the monitors' inputs, or bypass them, to a conventional live video feed until the system is operating correctly.

Figure 3B:
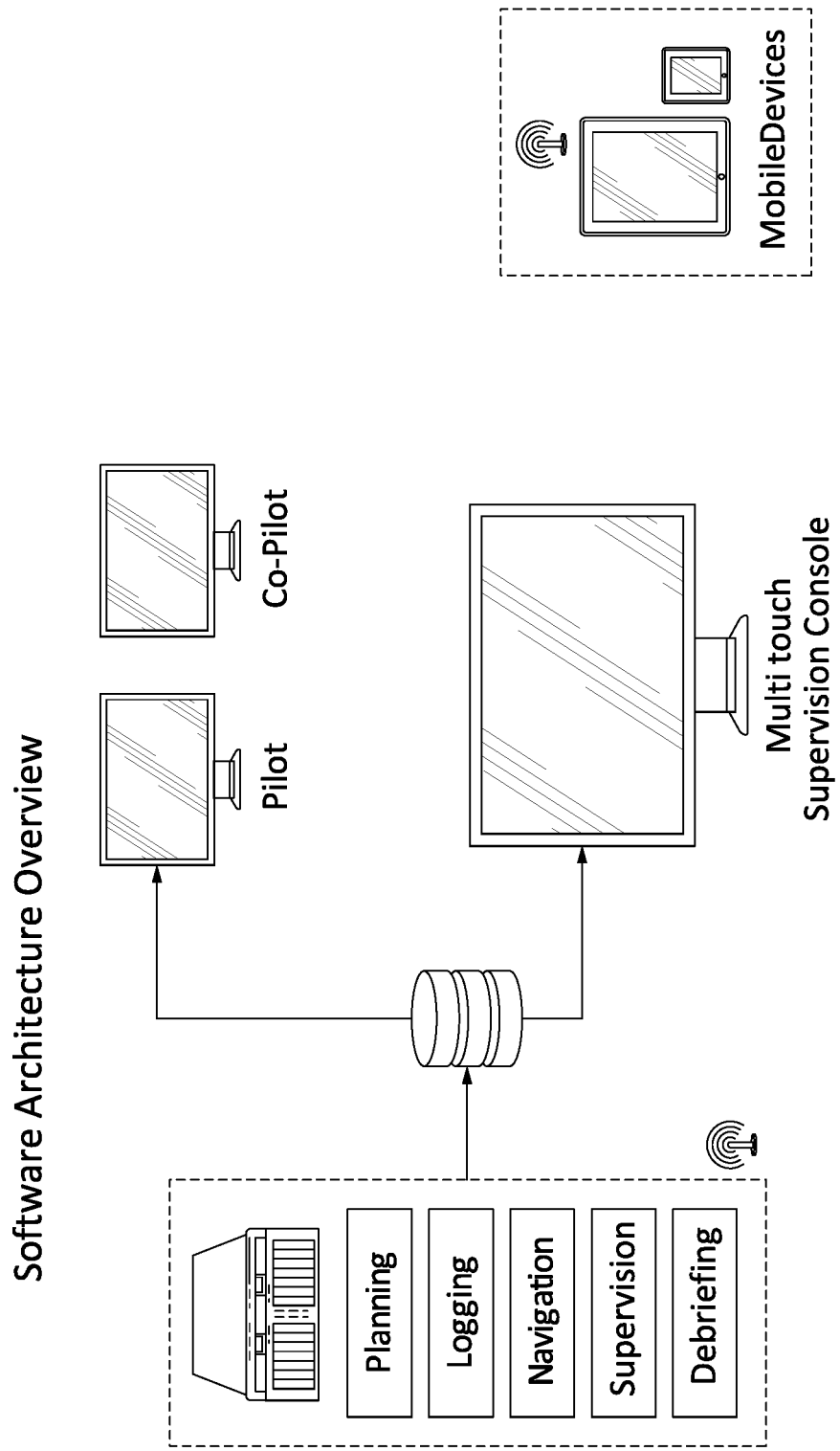
Figure 3C:
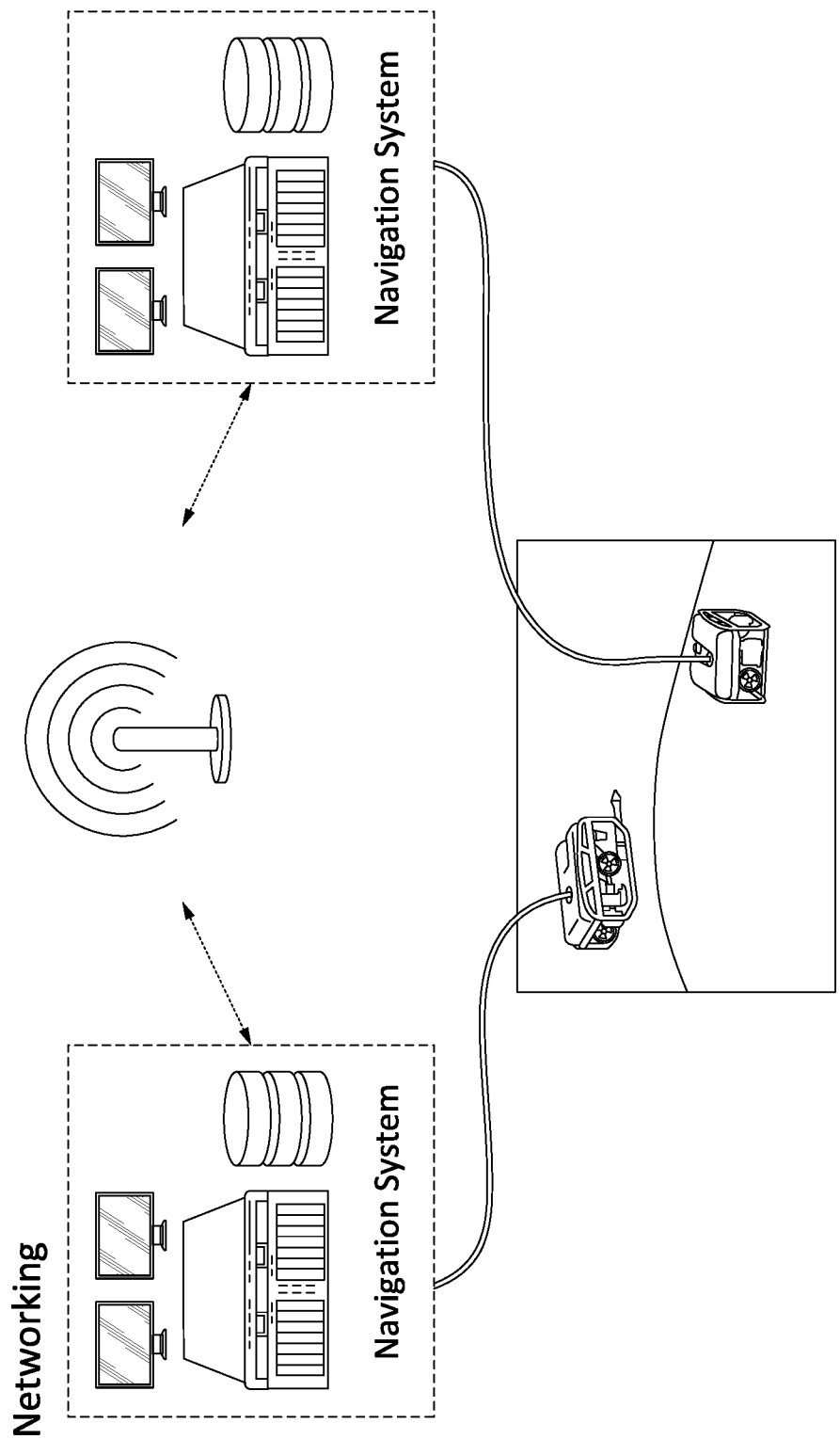
FIG. 3C is a diagrammatic illustration of networked systems, according to some embodiments.

FIG. 3B depicts a further software architecture overview illustrating that the operating system 3, which mediates the aforementioned user functions, is networked to provide communication between a multi touch supervision console and a pilot or pilots. FIG. 3C illustrates yet another level of connectivity, wherein the navigation system of a first ROV may share all of its dynamic data with the navigation system of another ROV over a network.

Visualization Engine

Figure 4:
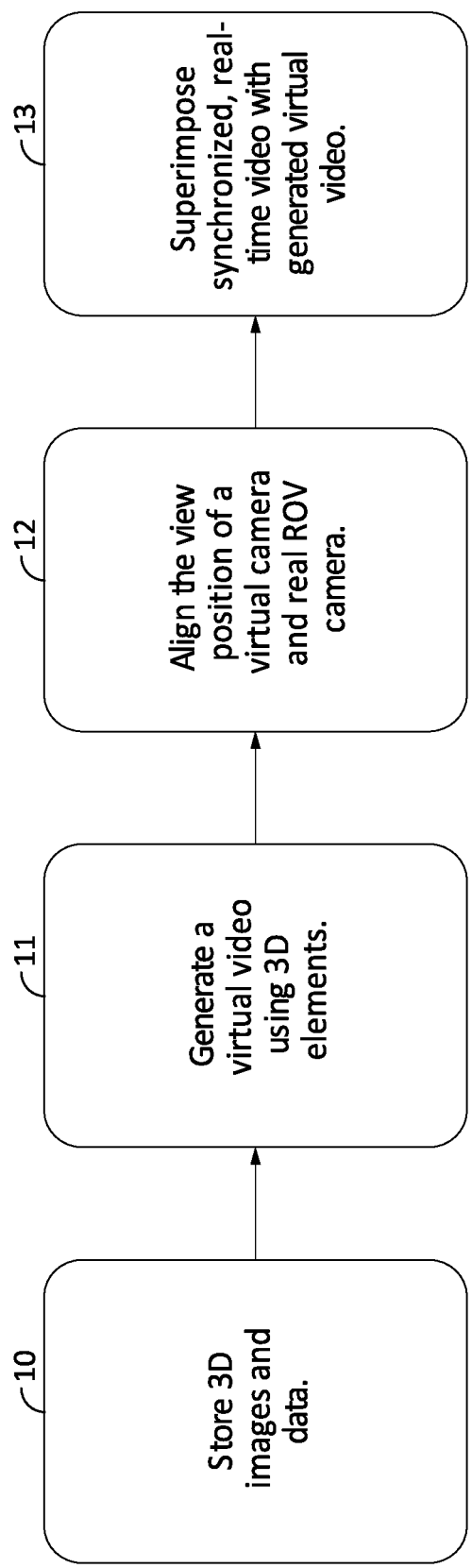
FIG. 4 depicts modules for achieving hybrid 3D imagery, and a method for their use, according to some embodiments.

As seen from FIGS. 1B and 3A, the operating system's 3 visualization engine further includes modules for implementing 3D imagery, two-dimensional ("2D") imagery, and providing a real-time environment update. These modules are shown in FIG. 4, which illustrates in a stepwise fashion how the system operates in some embodiments to create superimposed hybrid 3D imagery.

A 3D database module 10 includes advanced 3D rendering technology to allow all the stages of ROV operation to be executed with reference to a visually re-created 3D deep-water environment. This environment is composed by the seabed bathymetry and modeled equipment, e.g., structures of ocean energy devices.

As discussed above, the main sources of image data may be pre-recorded 3D modeling of sonar data (i.e., computer-generated 3D video) and possibly other video data; live sonar data obtain in real time; video data obtained in real time; user-determined 3D elements; and textual or graphical communications intended to be displayed on the user interface screen. The geographical position and depth (or height) of any elements or regions included in the image data are known by GPS positioning, by use of acoustic and/or inertial positioning systems, and/or by reference to maps, and/or by other sensor measurements.

In some embodiments, a virtual video generation module 11 is provided for using the aforementioned stored 3D elements or real-time detected 3D elements to create a virtual video of such 3D elements. The virtual video generation module 11 may work in concert with a synchronization module 12.

The synchronization module 12 aligns the position of the virtual camera of the virtual video with the angle and position of a real camera on an ROV. According to some embodiments the virtual camera defines a field of view for the virtual video, which may extend, for example, between 45 and 144 degrees from a central point of view.

Figure 5A:
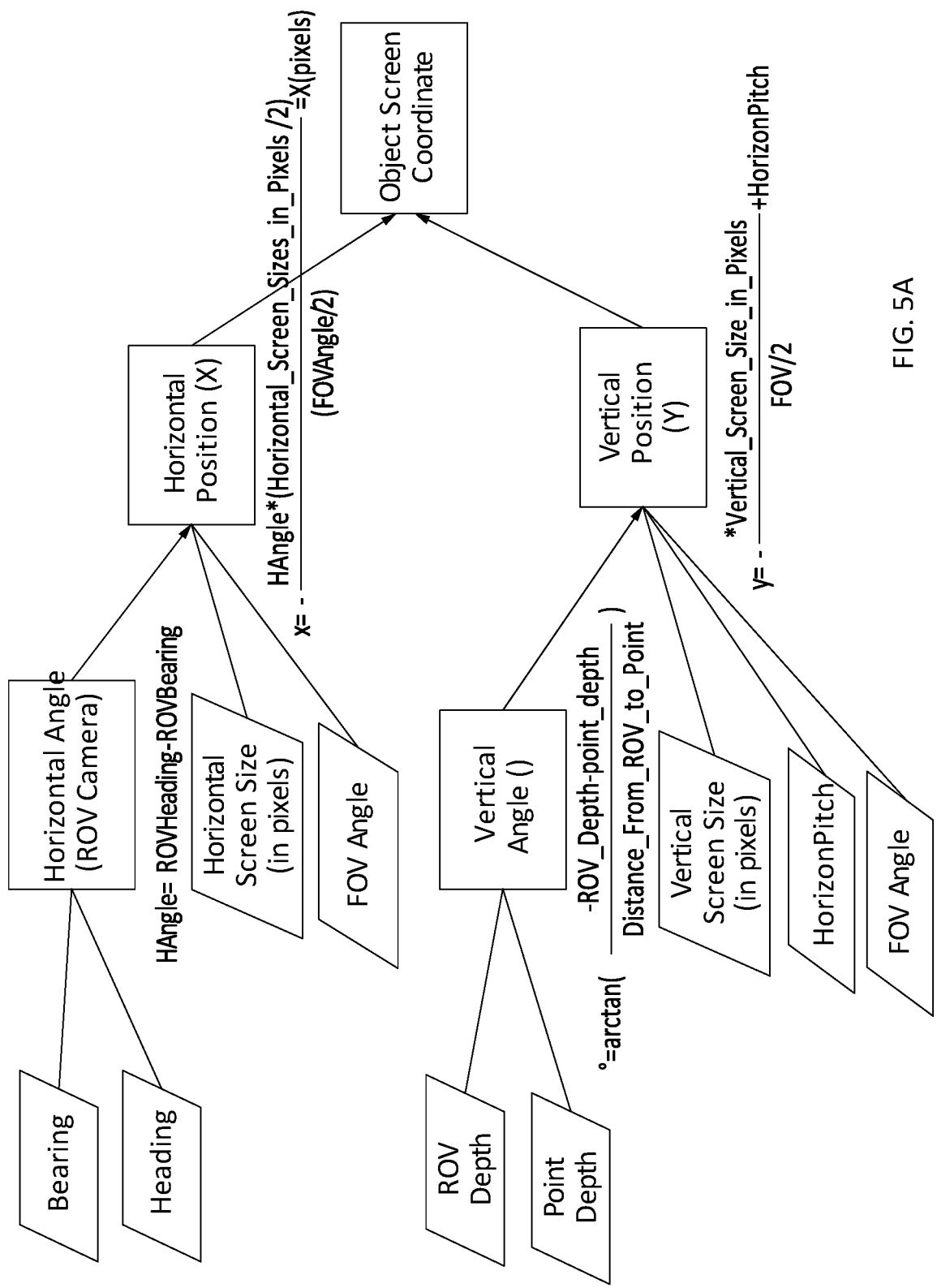
FIG. 5A illustrates calculations for aligning a virtual video and a real video, according to some embodiments.

As illustrated in FIG. 5A, the alignment of virtual and real camera angles may be accomplished by calculating the angle between the heading of the ROV and the direction of the camera field of view; calculating the angle between the vertical of the ROV and the direction of the camera field of view; and calculating the angle between the ROV and the geographic horizon. These calculated angles are then used to determine an equivalent object screen coordinate of the digital X-Y axis at determined time intervals or anytime a variable changes value.

A superimposition module 13, whose function is additionally diagrammed in FIG. 5B, is provided for superimposing the generated virtual video 20 and the synchronized, real-time video 21 acquired by the ROV's digital camera. The result is hybrid superimposed 3D imagery 22, wherein the system effectively draws the generated 3D environment on top of the non-visible part of the video feed, thus greatly enhancing visibility for the ROV pilot. More specifically, the superimposition software divides the camera-feed video and the generated 3D video into several layers on the z-buffer of the 3D rendering system. This permits the flattening of the layers and their superimposition, which simulates spatial perception and facilitates navigation.

Yet another feature of the superimposition module 13 is that either one or both of the virtual 20 or real videos 21 may be manipulated, based upon a luminance threshold, to be more transparent in areas of lesser interest, thus allowing the corresponding area of the other video feed to show through. According to some embodiments, luminance in the Red-Green-Blue hexadecimal format may be between 0-0-0 and 255-255-255, and preferably between 0-0-0 and 40-40-40. Areas of lesser interest may be selected by a system default, or by the user. The color intensity of images in areas of lesser interest is set at the luminance threshold, and the corresponding region of the other video is set at normal luminance. For the example shown in FIG. 5B, the background of the virtual video 20 is kept relatively more transparent than the foreground. Thus, when the real video 21 is superimposed on the virtual 3D image 20, the real video 21 is selectively augmented primarily with the virtual foreground, which contains a subsea structure of interest.

Navigation Engine

The on-screen, 2D Navigation Interface for the ROV pilot involves superimposing geopositioned data or technical information on a 2D rendering system. Geopositioning or geo-tagging of data and elements is executed by reference to maps or to global positioning satellites. The resulting Navigation Interface, as seen in FIGS. 6A-6D, is reminiscent of aviation-type heads up display consoles. In the case of subsea navigation, the display is configured to indicate ROV 1 position based on known coordinates, and by using a sonar system that records 3D images from a ROV's position for later navigation. In this way, the embodiments described herein provide immersive visualization of ROV's operation.

Figure 6A:
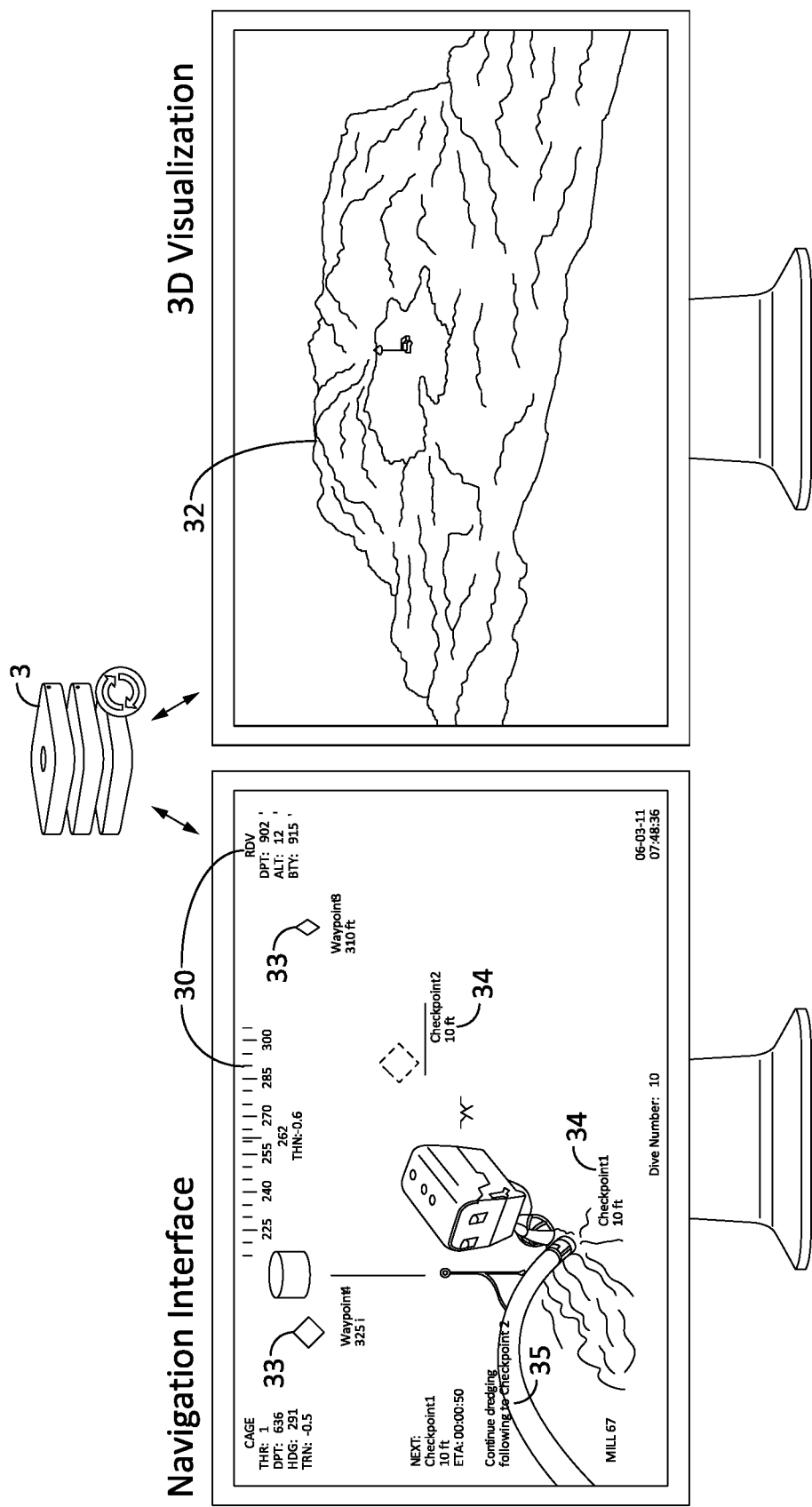
FIGS. 6A-6E depict several views of a navigation interface, according to some embodiments.
Figure 6B:
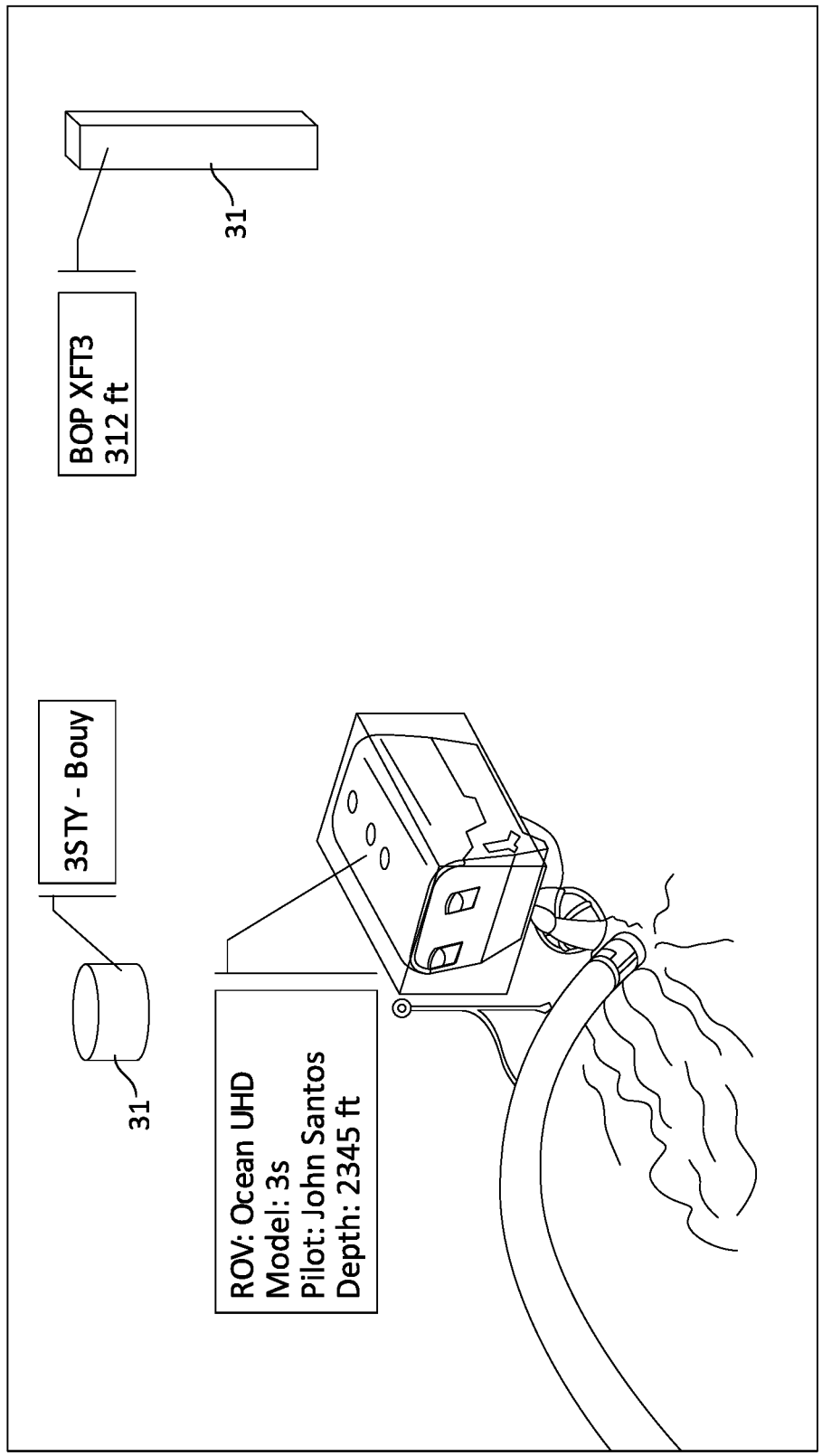

FIG. 6A illustrates the superposition of textual information and symbols 30 onto the 2D video rendering of the ROV user interface. FIG. 6B illustrates the superposition of 3D elements 31 onto the video rendering. The superposition of these data onto the video feed is useful, not only for navigating and controlling the ROV 1, but also for executing the related planning and supervising functions of the operating system 3. This superposition may be accomplished in a similar way to the superimposition of the video feeds, i.e., by obtaining screen coordinates of an object, and rendering text and numbers near those coordinates.

The planning module enables engineers and/or supervisors to plan one or several ROV missions. Referring again to FIG. 6A, an important feature of the planning module is the input and presentation of bathymetry information 32 through 3D visualization. As seen on the Navigation Interface, waypoints 33 and checkpoints 34 are superimposed onto the video feed. These elements may be identified, for example, by number, and/or by distance from a reference point. In other words, in addition to superimposing the technical specifications and status information 30 for the ROV 1 or other relevant structures, the Navigation Interface also provides GPS-determined positions for navigation and pilot information.

In some embodiments, procedures 35, including timed procedures (fixed position observation tasks, for example), may be included on the Navigation Interface as text. Given this procedural information, a ROV pilot is enabled to anticipate and complete tasks more accurately. A user may also use the system to define actionable areas. Actionable areas are geopositioned areas in the undersea environment that trigger a system action when entering, leaving, or staying longer than a designated time. The triggered action could be an alarm, notification, procedure change, task change, etc.

Figure 6C:
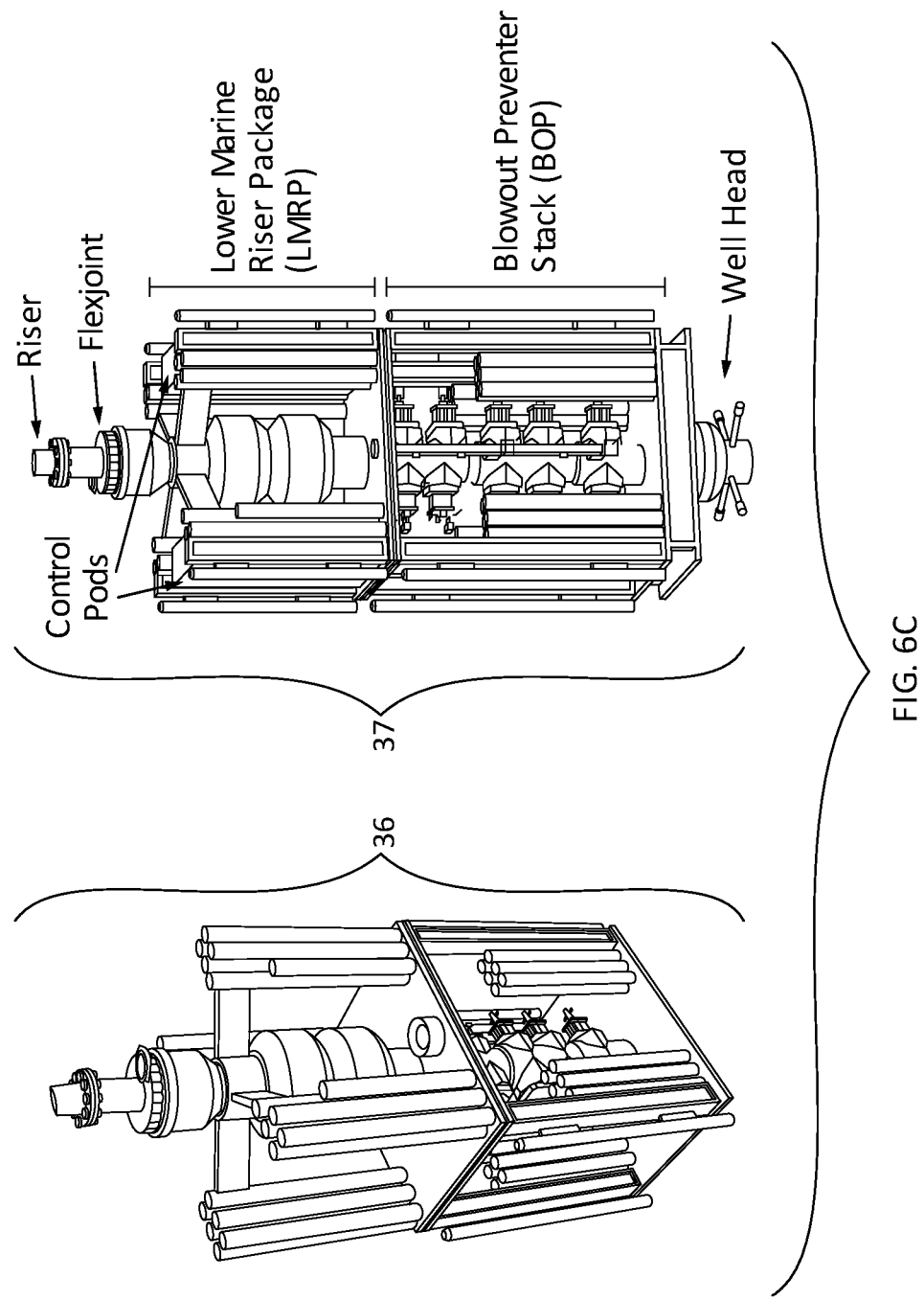

Referring to FIG. 6C, using a series of rules established in the planning module, or by manual input, the system may show more or less 2D geo-tagged information on the Navigation Interface. For example, as seen at 36, during a ROV operation when the pilot is at 100 meters from a geo-tagged object, the system may show only general information relating to the overall structure, or specific information needed for a specific current task in the nearby area. As the pilot approaches the geo-tagged structure, shown at 37, the system may incrementally show more information about components of that structure. This dynamic and manual level of detail control may apply to both textual and symbolic information 30, as well as to the augmentation of 3D elements 31.

Figure 6D:
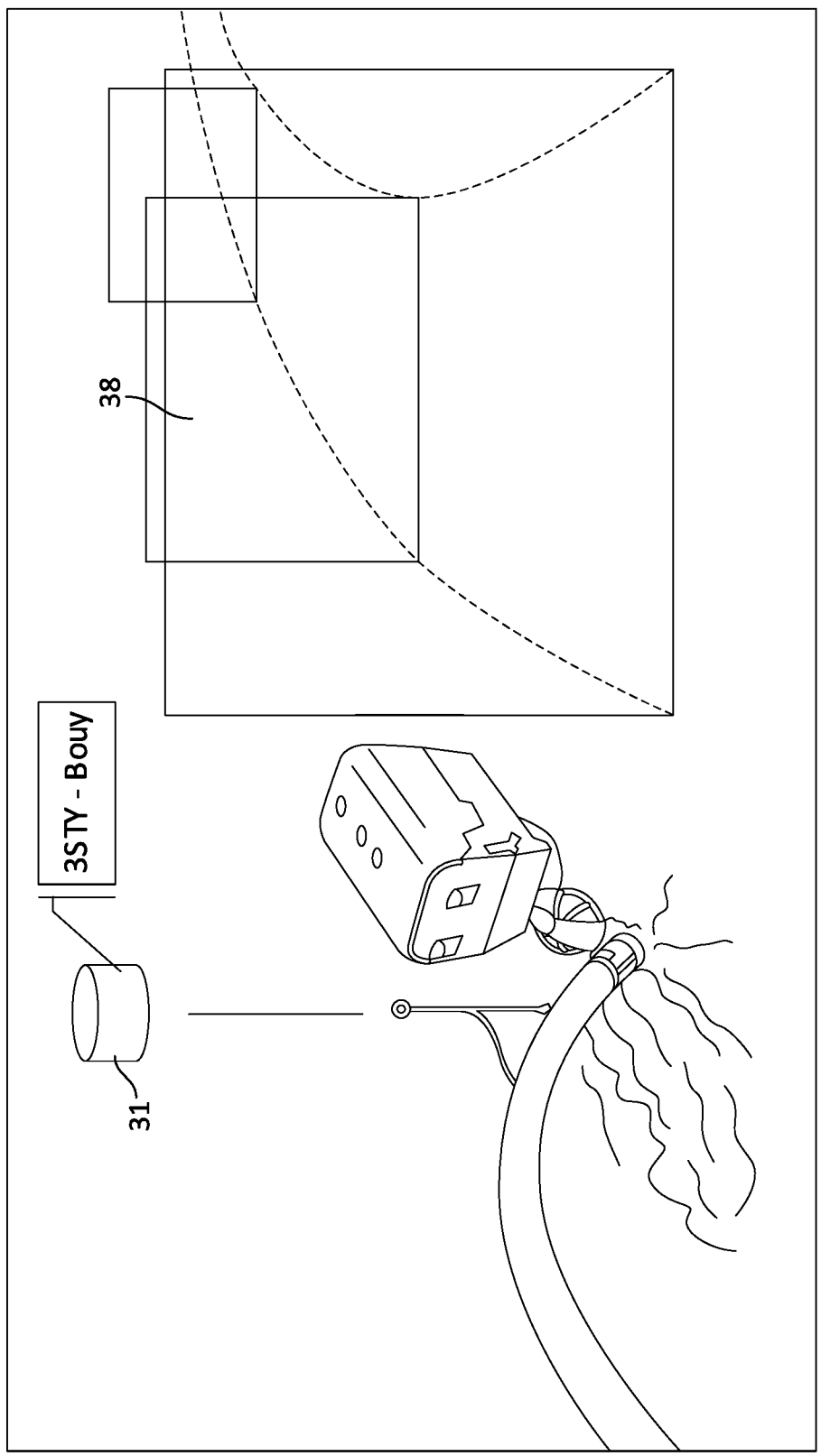
Figure 6E:
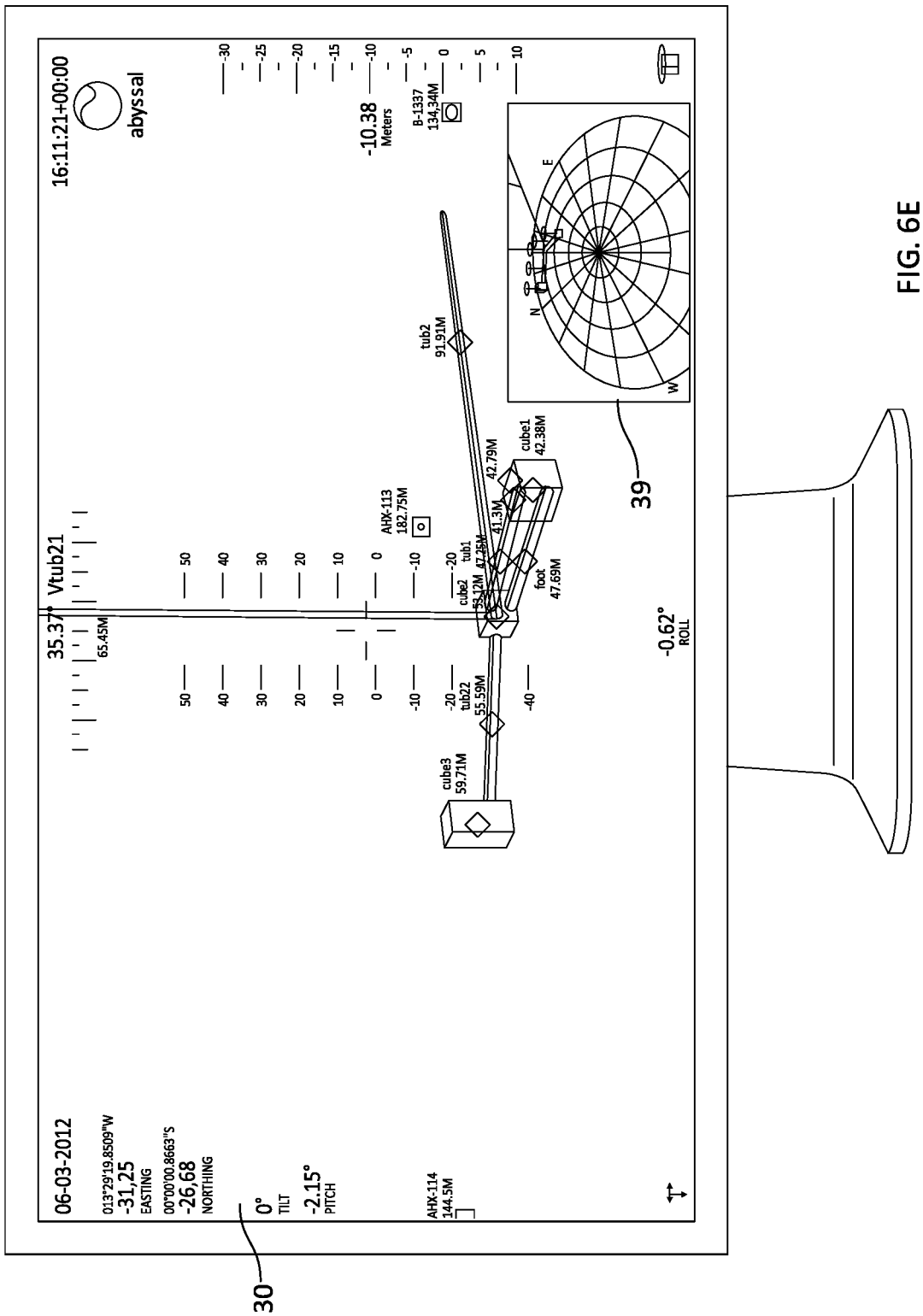

With reference to FIG. 6D, the planning module may also provide on-screen information relating to flight path 38. As seen in FIG. 6E, another important feature of the invention is embodied by a minimap 39, i.e., a graphic superimposed on the video, which may include a variety of different representations, such as small icons representing target objects. The minimap 39 may show the cardinal points (North, South, East, West) in a 3D representation, optionally in addition to a representation of a relevant object in tridimensional space. The minimap 39 may be positioned in a corner, and may be moved, dismissed and recalled by the user.

Data Engine

The data engine, which mediates the data warehousing and data transfer functions of the invention, therefore incorporates the logging and supervising modules.

The logging module logs or records all information made available by the operating system and saves such data in a central database for future access. The available information may include any or all telemetry, sonar data, 3D models, bathymetry, waypoints, checkpoints, alarms or malfunctions, procedures, operations, and navigation records such as flight path information, positioning and inertial data, etc.

An essential part of any offshore operation providing critical data to the client after the operation is concluded.

After the operation, during the debriefing and reporting stage, the debriefing and reporting module may provide a full 3D scenario or reproduction of the operation. The debriefing and reporting module may provide a report on the planned flight path versus the actual flight path, waypoints, checkpoints, several deviations on the plan, alarms given by the ROV, including details of alarm type, time and location, procedures, checkpoints, etc. ready to be delivered to the client. Accordingly, the operating system is configured to provide four-dimensional (three spatial dimensions plus time) interactive reports for every operation. This enables fast analysis and a comprehensive understanding of operations.

Yet another software element that interacts with of the Navigation Interface is the supervisor module. Execution of the supervisor module enables one or more supervisors to view and/or utilize the Navigation Interface, and by extension, any ROV 1 being controlled from the interface. These supervisors need not share the location of the ROV pilot or pilots, but rather may employ the connectivity elements depicted in FIGS. 3B and 3C. A plurality of multi touch supervision consoles may be used at different locations. For example, one could have nine monitors connected to three exemplary hardware structures, including an ROV 1, where only one operating system 3 gathered the ROV data and shared information with the others. Alternatively, between one and 12 networked monitors may be used, and preferably between 3 and 9 may be used. Networking provided as shown in FIGS. 3B and 3C may reduce risks, such as human error, in multiple-ROV operations, even those coordinated from separate vessels. Networking through the supervisor module allows for the sharing of information between ROV systems, personnel and operations across the entire operation workflow.

Leveraging Synthetic Data to Train Machine Learning Models

According to some embodiments, another feature is the ability to leverage synthetic data to train machine learning models. This is further described and shown with respect to FIG. 7.

Figure 7:
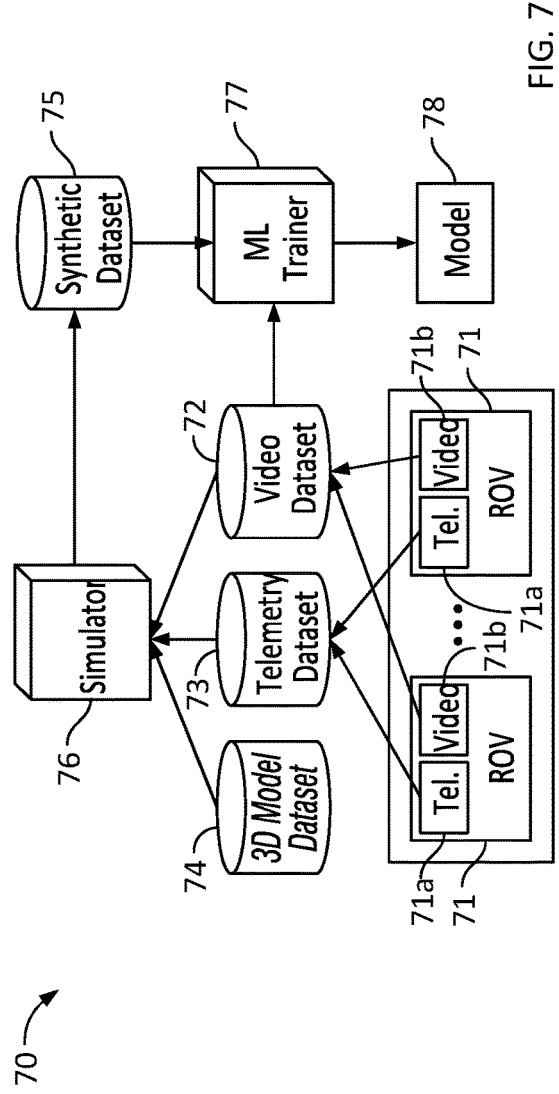
FIG. 7 illustrates a block-diagram overview of components of a synthetic training engine, according to some embodiments.

FIG. 7 illustrates a block-diagram overview of components of a synthetic training engine 70 that includes ROVs 71 with telemetry 71a (such as positional sensors) and video capability 71b (such as a video camera), video dataset 72, telemetry dataset 73, 3D model dataset 74, synthetic dataset 75, a simulator module 76, a machine learning trainer module 77, and a model 78. The synthetic training engine 70 may operate offline and may operate independently of operating system 3 at times. The synthetic training engine 70 produces a model (e.g., model 78 or the similar model 83 described herein with reference to FIG. 8) that is then copied to the operating system 3.

The ROV 71 may be similar to or the same as, and operate in a similar manner to or the same as, ROV 1 described herein and shown in FIG. 1A. Synthetic training engine 70 includes various datasets, which may operate like, or in conjunction with, the data engine described herein and shown in FIG. 3A. More specifically, the video dataset may store video, such as video coming from one or more ROV 71. The telemetry dataset 73 may store telemetry, such as telemetry coming from the one or more ROV 71. The 3D model dataset 74 may include 3D models of the scenes where the one or more ROV 71 is operating. The synthetic dataset 75 may store, for example, synthetic videos and labels. In some embodiments, the simulator module 76 may have access to the video dataset 72, the telemetry dataset 73, the 3D model dataset 74, and the synthetic dataset 75. In some embodiments, the simulator module 76 may also include a ROV's piloting simulator. In some embodiments, the machine learning trainer module 77 may have access to the video dataset 72 and the synthetic dataset 75. The model 78 may include an application using the model trained in the machine learning trainer module 77. The model 78 may be connected to one or more ROVs and may run in the operating system 3.

ROV 71 may be used in several underwater applications, such as inspection and maintenance of oil and gas structures. The ROVs may contain sensors that obtain real world coordinates and video camera systems, such as a monocular video camera system.

Simulator module 76 may be operable to replay a mission in a ROV's pilot training simulator. To do so, the simulator module 76 may retrieve the ROV's telemetry and the scene's 3D models from the datasets. The simulator module 76 may denoise the ROV's telemetry signal and then, by placing the simulator's camera on the ROV's position, may generate a synthetic video of the mission. In some embodiments, the simulator module 76 may be used to generate synthetic data from different views as in the real missions or even from synthetic scenes. The synthetic training engine 70 can use this pairing of synthetic and real videos to train machine learning ("ML") models.

Figure 8:
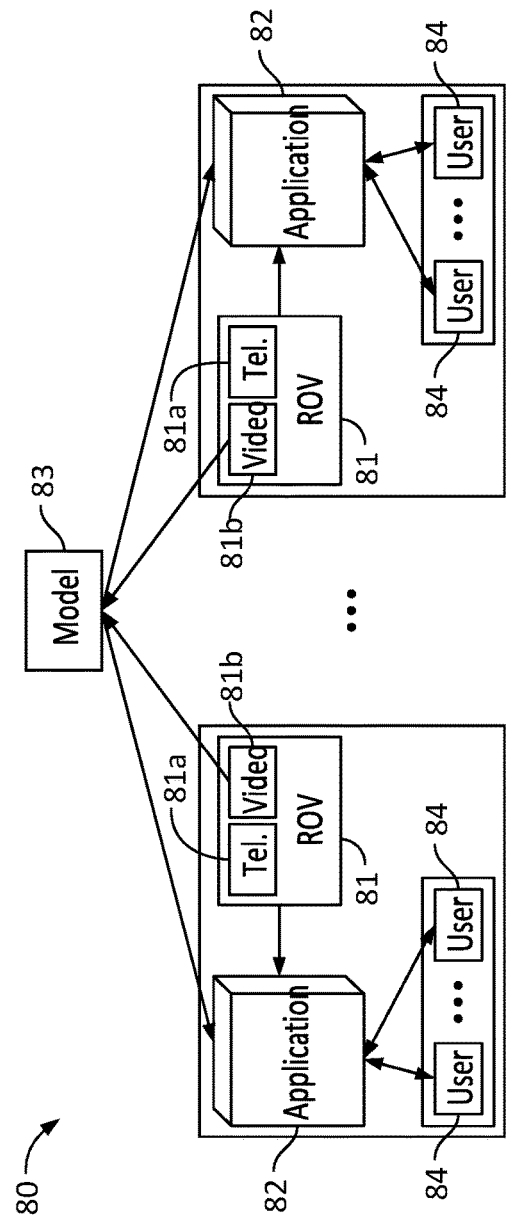
FIG. 8 illustrates interactions between components of a machine learning model, according to some embodiments.

FIG. 8 illustrates interactions between components of a machine learning model, according to some embodiments. FIG. 8 illustrates a ML model 80, ROVs 81 with telemetry 81a and video capability 81b, application(s) 82, model 83, and a graphical user interface (GUI) 84 for displaying output to users. ROVs 81 may be the same, or similar to, ROV 1. Application(s) 82 may be part of user interface 2. Model 83 may be the same, or similar to, the models produced by the synthetic training engine 70 (e.g., model 78). In some embodiments, model 83 may be run inside the operating system 3.

One technological improvement provided by the embodiments disclosed herein is that the synthetic training engine 70 can automatically annotate the real images for several tasks such as object segmentation, depth map estimation, and even classifying whether a certain structure is in the image.

Another technological improvement is that, after making the model (e.g., model 78 or 83) invariant to the domain of the input, the synthetic training engine 70 can train the ML model 80 with synthetic images and the ML model 80 will work on real images.

In some embodiments, the output of ML model 80 can perform some valuable task, such as the detection of integrity threats in underwater oil and gas structures. The model 83 is placed in a computer (e.g., operating system 3) that is connected to ROV 71 as shown in FIG. 8. The output of ML model 80 is sent to a computer having a GUI 84 providing the valuable information to the users.

The synthetic training engine 70 may replay a real mission in the virtual world and annotate the real images. Thus, the synthetic training engine 70 can train a standard convolutional neural network ("CNN") g to predict a label y for a given real image x.

This is achieved by minimizing a loss function $L_r(y,g(x))$. Moreover, the dataset can be augmented by using the synthetic images $\hat{x}$ to train g. Again, this is achieved by minimizing another loss function $L_s(y,g(\hat{x}))$. Therefore, the full loss function to be minimized is the sum of $L_r$ and $L_s$:

$$L_g = L_r + L_s. \quad \text{(Equation 1)}$$

Even though the synthetic image represents the same information as the real image, the pixel values of the two are still different. This may happen due to, for instance, differences in texture and lighting. Therefore, the naïve approach of mixing real and synthetic images into a single dataset and training a model does not work well.

To overcome this technical problem, the synthetic training engine 70 maps the real and synthetic images to a common feature space. For that, the synthetic training engine 70 creates two models: one that extracts features from real images $f_r$ and another that extracts features from synthetic images $f_s$. For a given pair of real and synthetic images (x,x^) depicting the same scene, the output of both feature extraction models should be the same. The two feature extraction models should be trained to minimize the L2 norm of the difference between the real and synthetic features:

$$L_f = \|f_r(x) - f_s(x\hat{})\|_2.$$ (Equation 2)

Then, the synthetic training engine 70 updates the classifier g to, instead of receiving an image as input, receive the output of the feature extraction models. More formally, for a real image x the output of the classifier is given by $g(f_r(x))$ and, for a synthetic image x^ the output is given by $g(f_s(x\hat{}))$.

The synthetic training engine 70 can use CNNs as functions $f_r$, $f_s$ and g. Then, the three CNNs can be trained jointly by minimizing both Equations 1 and 2. A diagram depicting the described model is shown in FIG. 9.

FIG. 9 depicts an architecture of a model 90 to map real and synthetic images, according to some embodiments. FIG. 9 depicts a real image 91, a synthetic image 92, and convolutional layers 93 that are represented by arrows (not all marked). Both the real and synthetic images are mapped into a shared feature representation by means of $f_r$ and $f_s$ and enforced by $L_f$. Then, the classifier g is trained on top of this shared feature representation for the task at hand by means of a loss function $L_g$.

Although previously described with reference to the case of classification, this can also be used on the segmentation case by changing the architecture of $f_r$ and $f_s$. For instance, the synthetic training engine 70 can use a U-Net like architecture for the feature extraction models as shown herein with respect to FIG. 10 and its accompanying description. In the end, this idea can be used for any supervised problem using deep neural networks.

Although the solution discussed with respect to FIG. 9 works well for situations where both the synthetic image and the real image are available, technical problems may arise where only either the synthetic image or the real image is available. The synthetic training engine 70 can overcome this technical problem.

The synthetic training engine 70 may have training settings, such as (i) simreal: both simulated and real data are available, (ii) sim: only simulated data is available; and (iii) real: only real data is available. The real setting is not mandatory but may improve results. For example, the real setting may be used when an agent's state in a video or image is not known and, therefore, cannot be properly simulated, but a human annotator still labeled the video or image. Otherwise, if the agent's state is available, the data is used in the simreal setting.

FIG. 10 depicts an architecture example for feature extraction models, according to some embodiments. FIG. 10 depicts U-net like architecture for a feature extraction model 100 for $f_s$ and $f_r$ for segmentation problems, a synthetic or real image 101, dark arrows 102 representing convolutional layers (not all marked), and dashed lines 103 representing the copying of the activations to deeper layers of the network.

The simreal setting was previously discussed. In contrast, for a single image modality, the synthetic training engine 70 may use only one branch of the feature extraction model 100 as shown in FIG. 10. For example, in the sim setting, only the $L_s$ loss function is used. Conversely, in the real setting, the synthetic training engine 70 only uses the $L_r$ loss function.

In some embodiments, such as the sim setting and the real setting, yet another modification may be used.

Additionally or alternatively, the synthetic training engine 70 may fix the feature extraction model and only update the parameters of the classifier so the feature extraction models do not detect domain specific features. Therefore, both $f_s$ and $f_r$ are only trained on the simreal case.

In some embodiments, instead of training the models sequentially in each of these three training settings, the models are trained on all of them at the same time. At each training step, the synthetic training engine 70 randomly samples from one of these three training settings $t \in [1, 3]$. Then, a sample is drawn from the dataset corresponding to the training setting t and the models' parameters are updated accordingly.

This random sampling training procedure avoids known problems with neural networks, such as the problem known as catastrophic forgetting or catastrophic interference. For instance, if the synthetic training engine 70 started training the model in the simreal setting and then moved on to the real setting, after some time the model would start to become worse at generalizing from synthetic to real data. Thus, there has been shown and described a system and method of operation for ROVs leveraging synthetic data to train machine learning models. The method and system are not limited to any particular hardware or software configuration. The many variations, modifications and alternative applications of the invention that would be apparent to those skilled in the art, and that do not depart from the scope of the invention, are deemed to be covered by the invention.

What is claimed is:

1. A system for operating a remotely operated vehicle (ROV) leveraging synthetic data to train a machine learning model and to display classification labels on a display of a navigation interface, the system comprising:
   a synthetic training engine comprising:
      a video dataset including at least one of: video data or real images coming from the ROV;
      a telemetry dataset including telemetry data coming from the ROV;
      a 3D model dataset including 3D model of a scene where the ROV is configured to operate;
      a synthetic dataset comprising synthetic images generated from different views of objects in the video data or different views of the 3D model of the scene, and associated training labels, the synthetic dataset providing additional data for the video dataset and the real images; and
      a machine learning model configured to determine classification labels for the objects shown in the video data or the real images, the machine learning model trained using data comprising the synthetic dataset; and
   a navigation interface configured to:
      display an object within an environment of the ROV; and annotate the displayed object using a corresponding classification label.

2. The system of claim 1, wherein the synthetic training engine is operable to automatically annotate a real image from the real images for object segmentation, depth map estimation, and classifying whether a specific structure is in the real image.

3. A method of leveraging synthetic data to train a machine learning model for operating a remotely operated vehicles (ROV) the method comprising:
- obtaining a video dataset including at least one of: video data or real images coming from the (ROV);
- obtaining a 3D model dataset including 3D model of a scene where the ROV is configured to operate;
  - generating a synthetic dataset comprising synthetic images generated from different views of objects in the video data or different views of the 3D model of the scene, and associated training labels, the synthetic dataset providing additional data for the video dataset and the real images;
- training a machine learning model using data comprising the synthetic dataset, the machine learning model configured to determine classification labels for the objects shown in the video data or the real images;
- displaying, using a navigation interface, an object within an environment of the ROV; and
- displaying, using the navigation interface, an annotation for the displayed object, the annotation corresponding to a classification label for the displayed object.

4. The system of claim 1, wherein the synthetic training engine is configured to map the real images and the synthetic images to a common feature space, wherein the common feature space comprises image features.

5. The system of claim 4, wherein the synthetic training engine further comprises:
- a real image feature extraction model configured to extract real image features from a real image from the real images; and
- a synthetic image feature extraction model configured to extract synthetic image features from a synthetic image from the synthetic images; and
- wherein, the real image feature extraction model and the synthetic image feature extraction model are trained such that an Euclidean norm (L2) norm of a difference between the real image features and the synthetic image features is minimized.

6. The system of claim 5, wherein the real image feature extraction model is a first convolutional neural network (CNN), and the synthetic image feature extraction model is a second CNN.

7. The system of claim 6, wherein the machine learning model is configured to receive one of the extracted real image features or the extracted synthetic image features.

8. The system of claim 7, wherein the machine learning model is a third CNN.

9. The system of claim 5, wherein the machine learning model is configured to:
- receive an input being a pair of sets of image features corresponding to an object, the pair comprising:
  - the extracted real image features for a real image from the real images; and
  - the extracted synthetic image features for a synthetic image from the synthetic images, the synthetic image corresponding to the real image; and
- output at least one predicted classification label corresponding to the object.

10. The system of claim 9, wherein the machine learning model is configured to output a first predicted classification label corresponding to the extracted real image features, and a second predicted classification label corresponding to the extracted synthetic image features, and wherein the machine learning model is trained to minimize a sum of two L2 norms, a first L2 norm being an L2 norm of a difference between the first predicted classification label and a corresponding training label from the training labels, and a second L2 norm being a norm of a difference between the second predicted classification label and the corresponding training label.

11. The system of claim 10, wherein the real image feature extraction model and the synthetic image feature extraction model are trained jointly with the machine learning model.

12. The system of claim 1, wherein the synthetic training engine further comprises a convolutional neural network configured to extract image features from one of a real image of the real images or a synthetic image of the synthetic images, and wherein the machine learning model is configured to output a predicted classification label corresponding to the object based on an input comprising the extracted image features.

13. The system of claim 12, wherein the machine learning model is trained to minimize an L2 norm being the L2 norm of a difference between the predicted classification label and a corresponding training label from the training labels.

14. The system of claim 1, wherein the machine learning model can be configured to receive one of:
- a pair comprising a real image from the real images and a synthetic image corresponding to the real image from the synthetic images;
- a real image from the real images; or
- a synthetic image from the synthetic images.

15. The system of claim 1, wherein the synthetic training engine is configured to replay a mission, and wherein the mission is replayed by retrieving ROV telemetry from the telemetry dataset and 3D model data from the 3D model dataset, denoising the telemetry data, and generating a synthetic video of the mission, the synthetic video including the classification labels for objects shown in the video.

16. The method of claim 3, further comprising:
- extracting real image features from a real image from the real images, using a real image feature extraction model; and
- extracting synthetic image features from a synthetic image from the synthetic images, using a synthetic image feature extraction model; and
- wherein, the real image feature extraction model and the synthetic image feature extraction model are trained such that an Euclidean norm (L2) norm of a difference between the real image features and the synthetic image features is minimized.

17. The method of claim 16, wherein the real image feature extraction model is a first convolutional neural network (CNN), and the synthetic image feature extraction model is a second CNN.

18. The method of claim 17, wherein the machine learning model is configured to receive one of the extracted real image features or the extracted synthetic image features.

19. The method of claim 17, wherein the machine learning model is a third CNN.

20. The method of claim 17, wherein the machine learning model is configured to:
- receive an input being a pair of sets of image features corresponding to an object, the pair comprising:

the extracted real image features for a real image from the real images; and the extracted synthetic image features for a synthetic image from the synthetic images, the synthetic image corresponding to the real image; and output at least one predicted classification label corresponding to the object.

\* \* \* \* \*